(12) United States Patent
Farinacci et al.

(10) Patent No.: US 7,826,348 B2
(45) Date of Patent: Nov. 2, 2010

(54) MULTICAST FAST REROUTE

(75) Inventors: Dino Farinacci, San Jose, CA (US); David R. Oran, Action, MA (US); John M. Zwiebel, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 569 days.

(21) Appl. No.: 11/789,927

(22) Filed: Apr. 26, 2007

(65) Prior Publication Data

US 2008/0267078 A1 Oct. 30, 2008

(51) Int. Cl.
H04L 12/28 (2006.01)

(52) U.S. Cl. .................. 370/228; 370/248; 370/390

(58) Field of Classification Search .................. None
See application file for complete search history.

(56) References Cited

U.S. PATENT DOCUMENTS

| | | | | |
|---|---|---|---|---|
| 5,485,465 A | * | 1/1996 | Liu et al. | 714/4 |
| 5,671,215 A | * | 9/1997 | Foglar | 370/227 |
| 6,097,720 A | | 8/2000 | Araujo et al. | |
| 7,519,662 B2 | * | 4/2009 | Watkinson | 709/204 |
| 2003/0112749 A1 | | 6/2003 | Hassink et al. | |
| 2006/0050643 A1 | | 3/2006 | Yoshimoto et al. | |
| 2006/0120396 A1 | | 6/2006 | Hasegawa et al. | |
| 2006/0221975 A1 | | 10/2006 | Lo et al. | |

OTHER PUBLICATIONS

Holbrook, et al., "IP Multicast Channels: Express Support for Large-scale Single-source Applications", ACM 1-58113-135-6/99/0006, 1999.
"IPriori 6.2: Carrier-Class Software System", Avici Systems Inc., 2004.

* cited by examiner

Primary Examiner—Steven H Nguyen
Assistant Examiner—Alex Skripnikov
(74) Attorney, Agent, or Firm—Cindy Kaplan

(57) ABSTRACT

A method and apparatus for fast reroute of multicast data are disclosed. In one embodiment, a method includes transmitting a multicast join message from a receiver towards a source on a primary path and transmitting an alternate multicast join message from the receiver towards the source on a backup path. Data packets are then received from the primary and backup paths. The method further includes operating in a first mode wherein the data packets received from the primary path are accepted and the data packets received from the backup path are dropped, and switching to a second mode wherein the data packets received from the backup path are accepted, upon detecting a failure in the primary path.

20 Claims, 7 Drawing Sheets

US 7,826,348 B2

MULTICAST FAST REROUTE

BACKGROUND OF THE INVENTION

The present disclosure relates generally to maintaining multicast data flow in the event of a network failure.

Traditional Internet Protocol (IP) communication allows a host to send packets to a single host (unicast transmission) or to all hosts (broadcast transmission). To support a demand to provide applications such as audio and video conference calls, audio broadcasting, and video broadcasting that involve high data rate transmission to multiple hosts, a third routing technique has evolved, multicast routing. In multicast routing, a host sends packets to a subset of all hosts as a group transmission. Multicast routing protocols have been developed to conserve bandwidth by minimizing duplication of packets. To achieve maximum efficiency delivery of data, rather than being replicated at the source, multicast packets are replicated in a network at the point where paths to multiple receivers diverge.

Conventional multicast routing systems depend on unicast routing protocols to detect a network failure. Redirection of impacted traffic does not occur until after the network failure has been identified by the unicast routing protocol and a new path has been established. In many cases, such as video applications that require near-zero packet loss, this impacts network performance during failure recovery. One approach to overcome this performance degradation is to provide source redundancy in which separate multicast hosts are provisioned and located in the network to achieve diverse paths. However, this requires the use of multiple hosts and synchronization of data streams. Also, the source redundancy model results in a significant waste of bandwidth.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
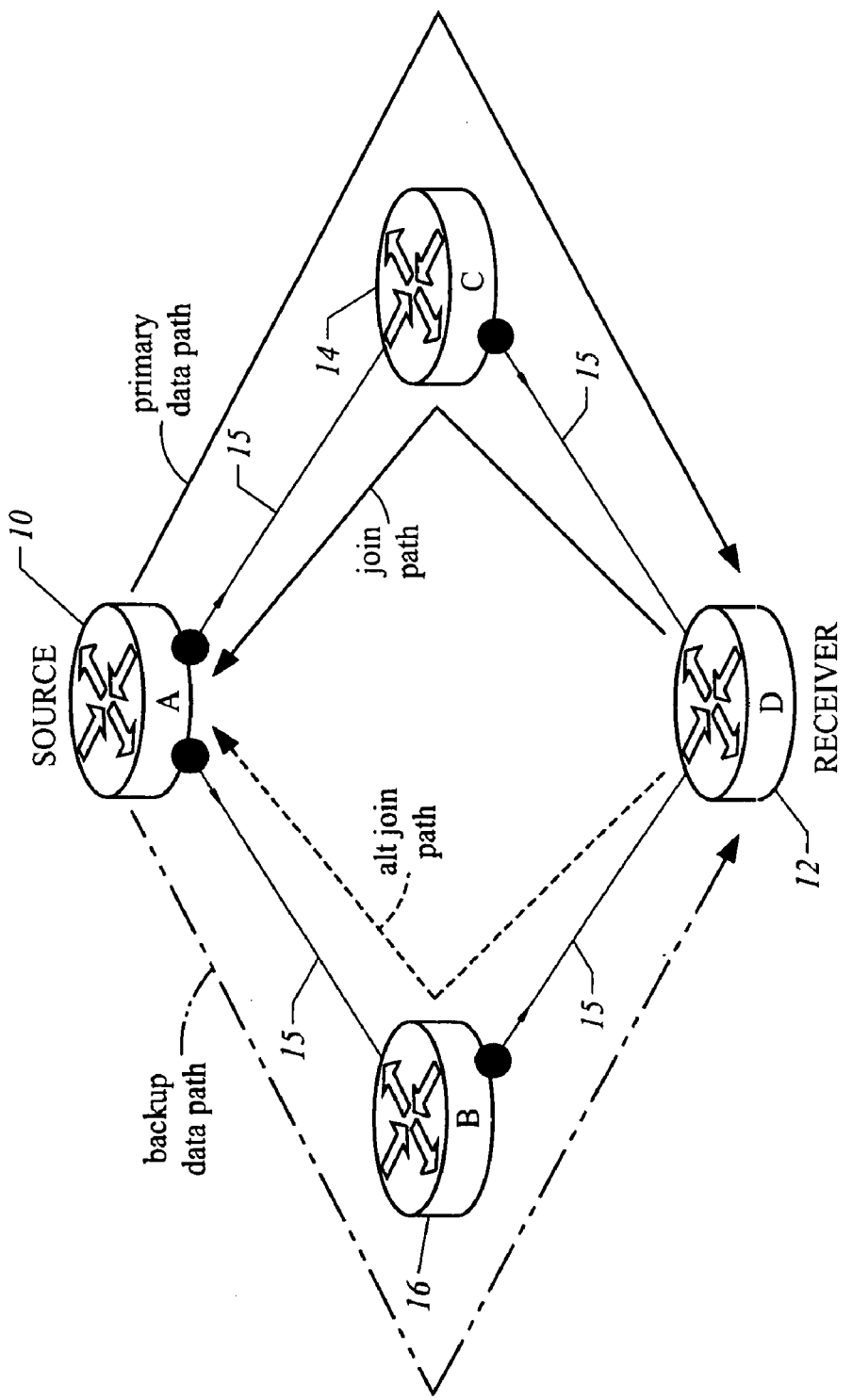
FIG. 1 illustrates an example of a network in which embodiments described herein may be implemented.

A method and apparatus for fast reroute of multicast data are disclosed. In one embodiment, a method includes transmitting a multicast join message from a receiver towards a source on a primary path and transmitting an alternate multicast join message from the receiver towards the source on a backup path. Data packets are then received from the primary and backup paths. The method further includes operating in a first mode wherein the data packets received from the primary path are accepted and the data packets received from the backup path are dropped, and switching to a second mode wherein the data packets received from the backup path are accepted, upon detecting a failure in the primary path.

In one embodiment, an apparatus for identifying a network failure and rerouting multicast data following a network failure generally comprises a receiver operable to receive multicast data from a primary path and a backup path, and a monitor configured to monitor multicast data received from the primary path and identify a failure in the primary path if flow of the monitored multicast data stops for more than a specified time interval. The apparatus further includes a controller configured to switch from a first mode wherein multicast data from the primary path is forwarded to a processor and multicast data from the backup path is dropped, to a second mode wherein the controller forwards the multicast data from the backup path to the processor, upon identification of a failure in the primary path.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein operate to reroute multicast data with minimal packet loss following a network failure. The method and system are referred to herein as multicast fast reroute (or multicast-only fast reroute). The multicast fast reroute system reroutes data before a failure is identified by a unicast routing protocol to provide minimal packet loss. The system operates to provide fast reroute to a backup path by making a local decision to switch to the backup, which requires less time than waiting for a unicast routing protocol signal on the network to switch to backup. As described in detail below, the system transmits alternate join messages on loop-free paths to distribute redundant packet data in a network. During normal operation, the redundant packets are discarded at topology merge points. When a failure occurs in a primary path, the redundant data is accepted after a local and very fast decision is made to accept the data. The system and method thus provide a "make-before-break" process for keeping multicast data flowing in the event of a node or link failure.

The embodiments described herein operate in the context of a data communication network including multiple network elements. Some of the elements in a network that employs the multicast fast reroute may be routers, switches, gateways, or other network devices. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate applications software. In one embodiment, the network device is implemented on a general purpose network host machine as described below with respect to FIG. 7.

The network implementing the embodiments is configured to use IP multicast, which simultaneously delivers a single stream of information to numerous recipients. A brief discussion of multicast routing is provided to help introduce concepts used in the embodiments described herein.

Multicast operation is based on the concept of a group. A multicast group is an arbitrary group of receivers that expresses an interest in receiving a particular data stream. An IP multicast address, or a portion thereof, specifies a particular group. Hosts that are interested in receiving data flowing to a particular group join the group using Internet Group Management Protocol (IGMP), for example.

Multicast-capable routers create distribution trees that control the path that IP multicast traffic takes through the network in order to deliver traffic to all receivers. Members of multicast groups can join or leave at any time; therefore the distribution trees are dynamically updated. In one embodiment, Protocol Independent Multicast (PIM) is used to dynamically create a multicast distribution tree to ensure distribution to intended receivers while limiting distribution so that network segments that are not in the path between the source and receivers are not burdened with unnecessary traffic.

In unicast routing, traffic is forwarded through the network along a single path from a source to the destination host according to pre-computed routes. A unicast router does not typically consider the source address; it considers only the destination address and how it would forward the traffic toward that destination. By contrast, in multicast forwarding the source is sending traffic to an arbitrary group of hosts that are represented by a multicast group address. The multicast router must determine which direction is the upstream direction (towards the root of the tree), and which one is the downstream direction (or directions). If there are multiple downstream paths, the router replicates the packet and forwards it down the appropriate downstream paths based on receiver interest. Forwarding multicast traffic away from the root is called Reverse Path Forwarding (RPF).

"RPF failure" is an important concept in multicast routing operation. Unicast routing techniques are used to determine a path from a receiver or intermediate node back to the tree root. Packets received via this path from the tree root are eligible for further forwarding downstream. When RPF is enabled on an interface, the router examines all packets received as input on that interface to make sure that the source address and source interface appear in the routing table and match the interface on which the packet was received. Packets received on other interfaces not connected to this path will not be forwarded and their receipt is referred to as RPF failure. As described below, RPF failure is used to identify redundant packet data.

Referring now to the drawings, and first to FIG. 1, an example of a network configured for multicast fast reroute is illustrated. The network includes a source 10 and a receiver 12. It is to be understood that the term "receiver" as used herein may also refer to intermediate nodes that operate as receivers in accordance with the method and system described herein. The source node 10 (router A) sends multicast data to receiver 12 (router D) via a primary data path and backup (alternate) data path. The nodes (A, B, C, D) are connected through communication links 15. The paths are loop-free paths, and in one embodiment the paths may be configured as ECMP (Equal Cost Multi-Path) or NECMP (Non-Equal but loop-free distribution of traffic among ECMP). The primary data path passes through intermediate node 14 (router C) and the backup data path passes through intermediate node 16 (router B). As described below with respect to the flowchart of FIG. 5, the redundant multicast data transmitted on the backup path will be discarded at receiver 12, until needed. If a failure occurs in the primary path, the redundant data is immediately available and accepted at receiver 12.

Figure 2A:
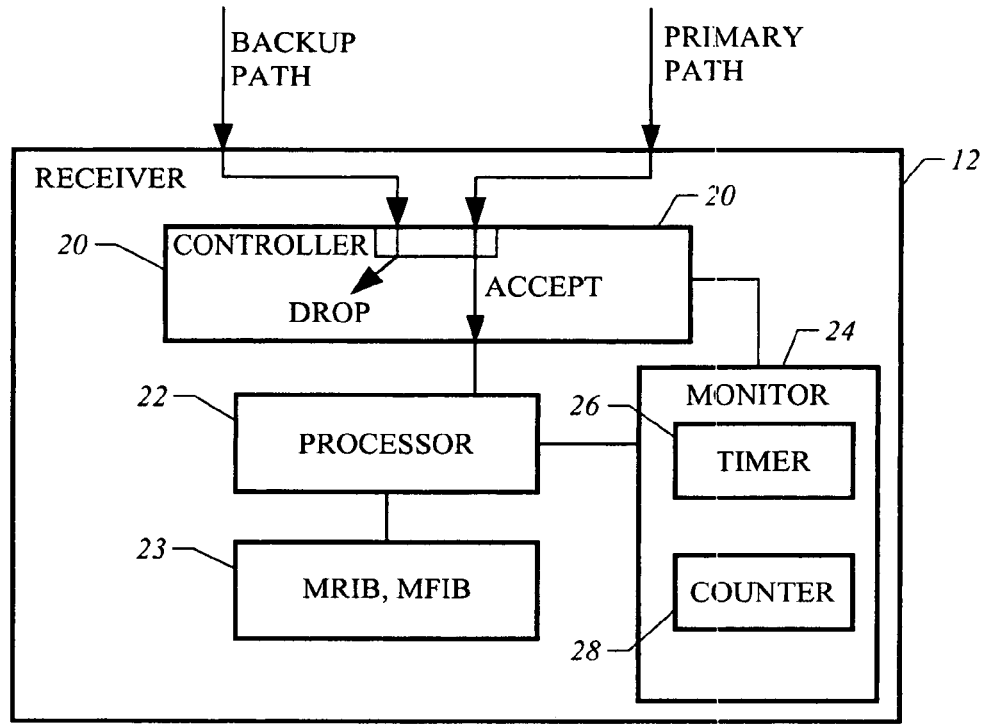
FIG. 2A is a block diagram illustrating one embodiment of a receiver of the network of FIG. 1 prior to failure in a primary path.
Figure 2B:
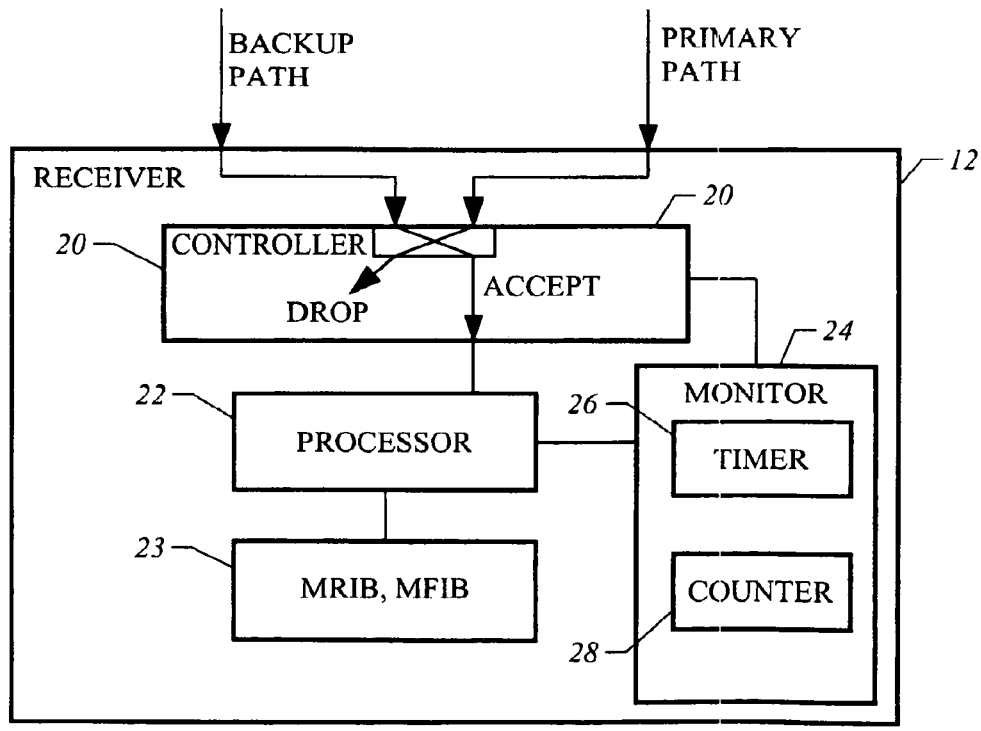
FIG. 2B is a block diagram illustrating the receiver after switching to a backup path.

FIGS. 2A and 2B are block diagrams schematically illustrating details of the receiver 12 according to one embodiment. FIG. 2A shows the receiver in a first mode (normal operation prior to a failure in the primary path) and FIG. 2B shows the receiver switched to a second mode (backup operation following a failure in the primary path). The receiver 12 includes a controller 20 operable to forward packets received from the primary path for processing at processor 22 and drop redundant packets received from the backup path, in the first mode (FIG. 2A). Upon receiving notification of a failure, the controller 20 is configured to switch to the second mode (FIG. 2B), so that packets received from the backup path are forwarded for processing and any packets received from the primary path are dropped.

In one embodiment, the receiver 12 comprises a monitor 24 for monitoring data packets received from the primary path. As described further below with respect to the flowchart of FIG. 6, the monitor 24 increments a counter 28 upon receiving a packet and starts a timer 26. Upon expiration of the timer 26, the monitor 24 checks to see if the counter 28 has changed (i.e., new packet received). If a packet has not been received, the monitor 24 signals the controller 20 that there is a possible failure on the primary path and the controller switches to the backup path (FIG. 2B).

The receiver 12 may also include an MRIB (Multicast Routing Information Base) and MFIB (Multicast Forwarding Information Base) 23. In one embodiment, the receiver includes two RPF interfaces in hardware with a bit provided to determine which interface is used. Interface down notification may be sent to the MRIB or MFIB, which updates the bit.

Figure 3:
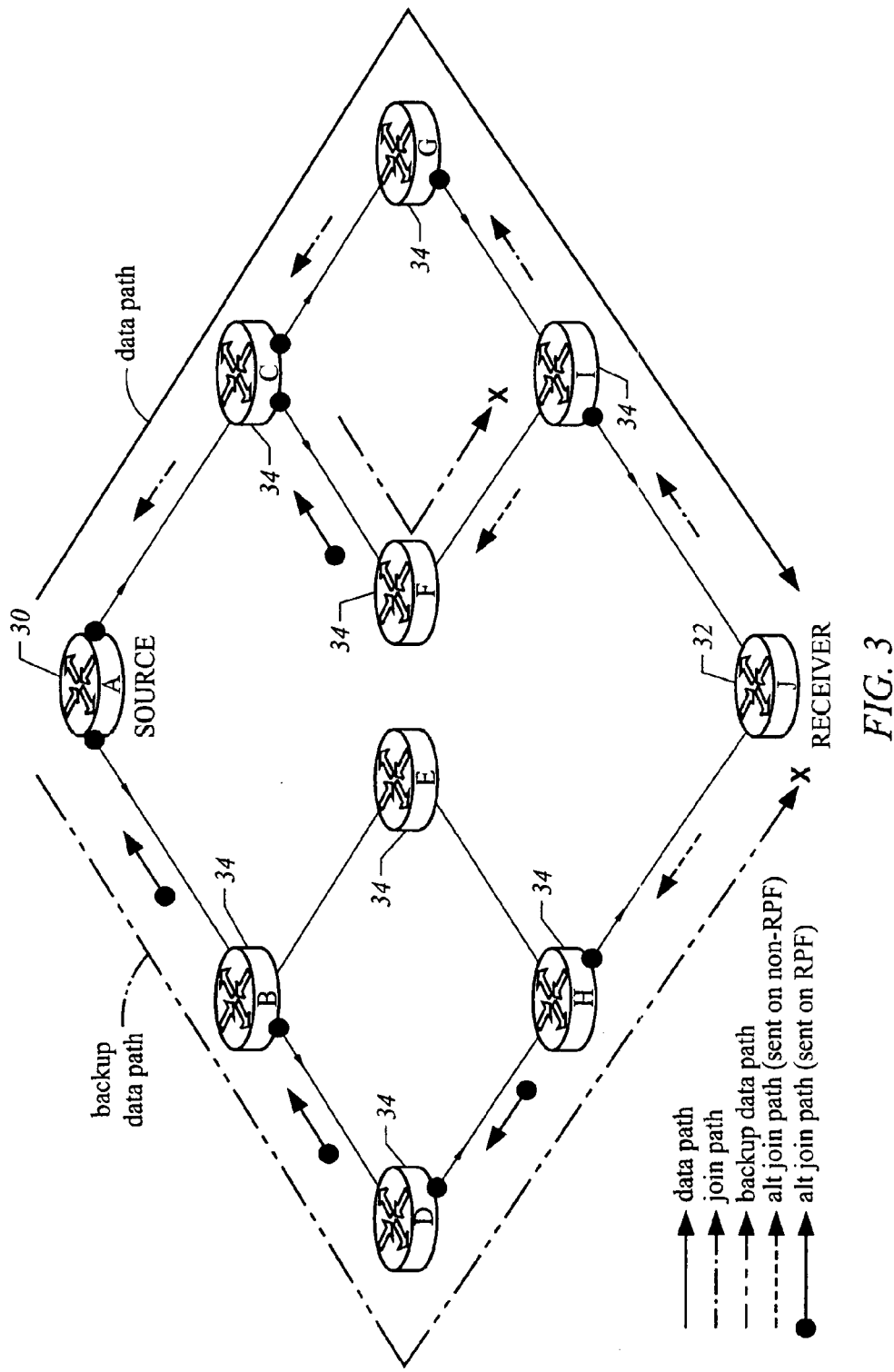
FIG. 3 illustrates an example of implementation in a network with parallel paths.
Figure 4:
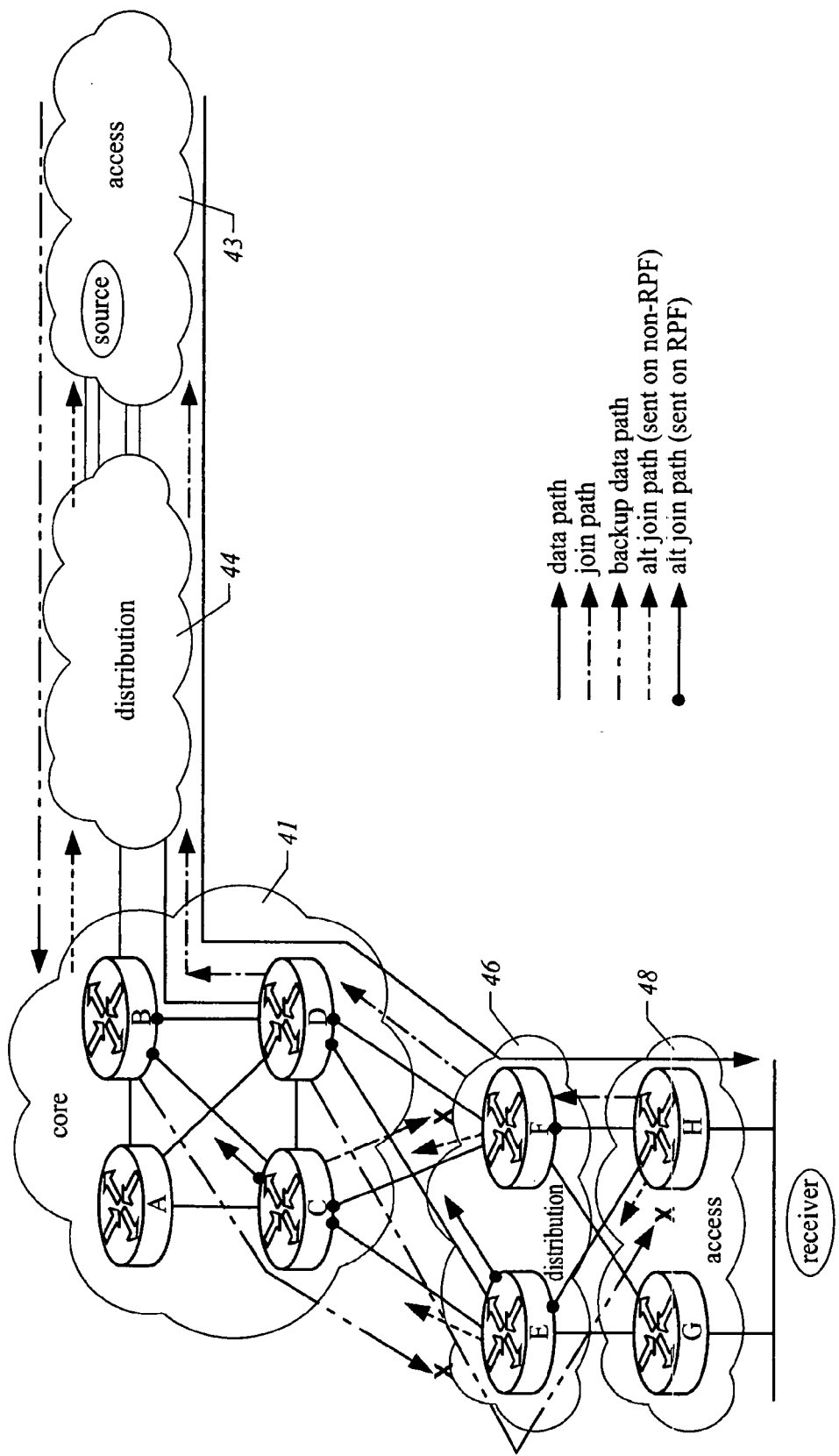
FIG. 4 illustrates an example of implementation with paths passing through a core network and a plurality of distribution and access networks.

FIGS. 3 and 4 illustrate additional examples of networks utilizing multicast fast reroute. These examples will be described following an overview of the process with reference to the basic network shown in FIG. 1 and flowchart of FIG. 5.

Figure 5:
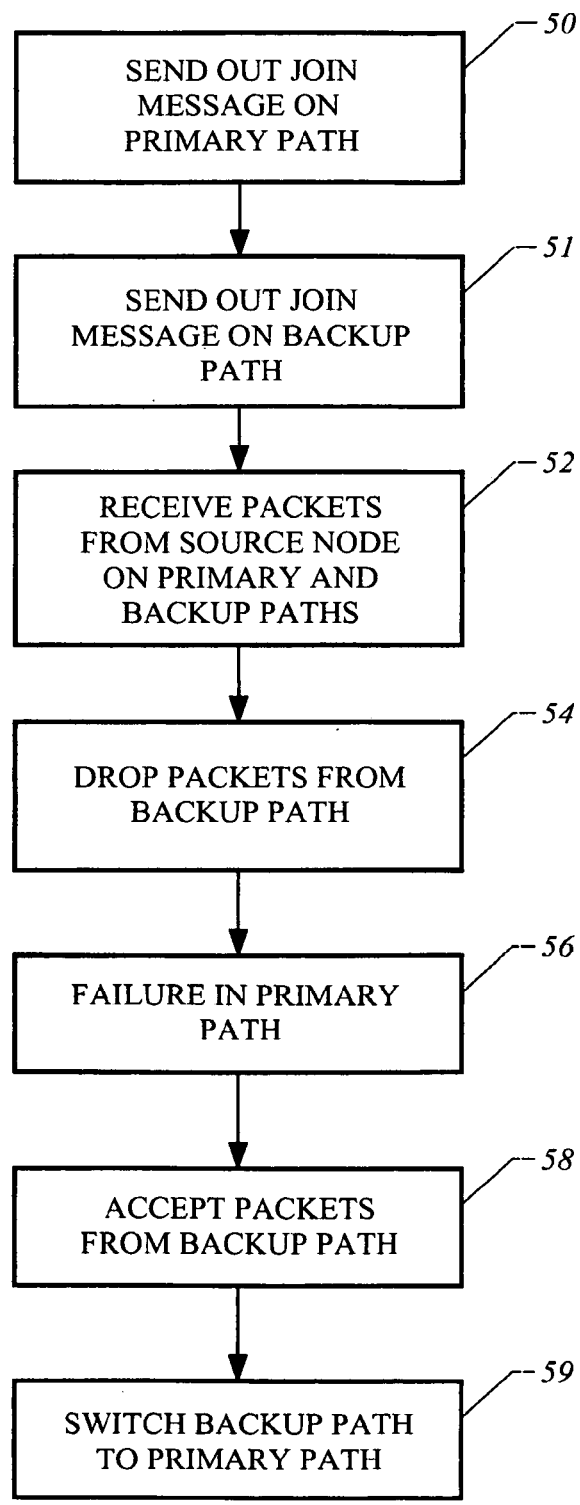
FIG. 5 is a flowchart illustrating an overview of a process for multicast fast reroute in accordance with one embodiment.

FIG. 5 illustrates one example of a process for multicast fast reroute. At step 50, the receiver 12 sends a join message (e.g., PIM join) on RPF path passing through node 14 (join path of FIG. 1). The receiver 12 also sends out an alternate join message (alt join path of FIG. 1) on non-RPF path passing through node 16 (step 51). The source node 10 has two outgoing interfaces (OIFs) (shown by dots at interfaces to links 15, with arrows indicating the direction data is forwarded from the router). The receiver 12 receives-duplicate packets from source node 10 (data from the primary data path and redundant data from the backup data path) (step 52). The receiver 12 drops packets from node 16 (backup data path) due to an RPF failure (step 54). As described above, an RPF failure signifies that a packet arrives on an interface that is not the one where packets from this source and group are expected to arrive.

At step 56 there is a failure in the primary path. The failure may be at node C or link DC, in which case the MRIB or MFIB receives an interface down notification. The failure may also be in another section of the primary path and identified by the monitor 24, as described below with respect to the flowchart of FIG. 6. The receiver 12 then switches to the backup path and accepts packets from node 16 (step 58). In one embodiment, the node 12 switches to the backup path in less than 10 milliseconds after identification of the failure. Once the unicast routing protocol identifies the failure in the primary data path, the backup data path is identified as the new RPF path and the MRIB updates its routes (step 59).

Figure 6:
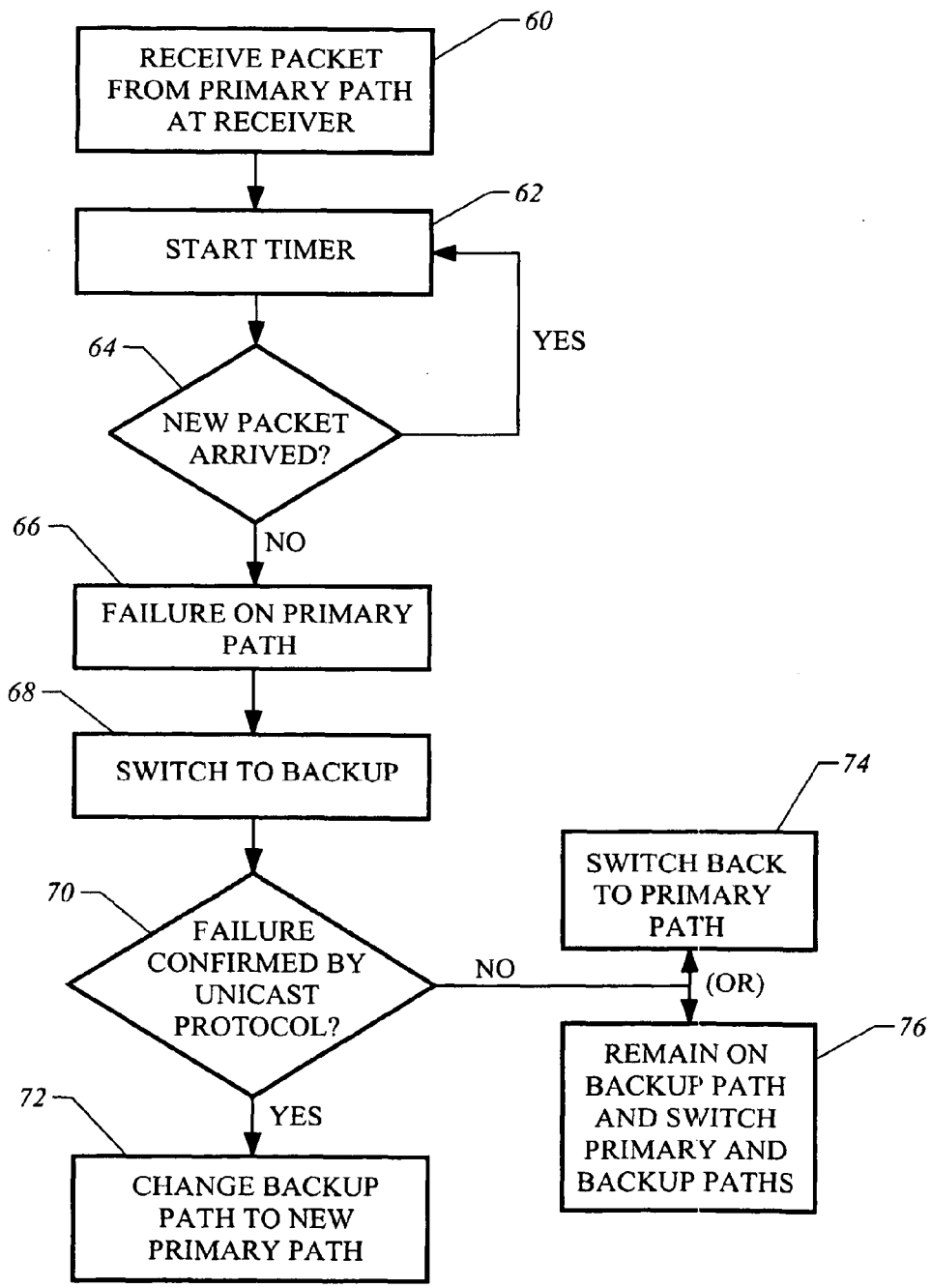
FIG. 6 is a flowchart illustrating details of a process for identifying a failure on the primary path and switching to the backup path, in accordance with one embodiment.

FIG. 6 is a flowchart illustrating a process for monitoring data flow to identify a failure anywhere along the data path from source node 10 to receiver node 12. At step 60, the receiver 12 receives a packet from the primary data path. As discussed briefly above with regard to FIGS. 2A and 2B, the receiver 12 includes a monitor 24 for monitoring data flow received from the primary data path. Counter 28 is incremented to signify the arrival of a new packet and timer 26 is started (step 62). In one embodiment, the timer 26 is set for approximately 100 milliseconds to account for interpacket delay. It is to be understood that other time intervals may be used and devices other than a counter may be used to track packets, without departing from the scope of the invention.

If a new packet arrives, the counter 28 is incremented and the monitoring continues. If the timer 26 expires and the counter has not changed (i.e., a new packet has not arrived), a possible failure is identified on the primary data path from source 10 to receiver 12 (steps 64 and 66). The receiver 12 then switches to backup mode at step 68. If the failure is eventually confirmed by the unicast routing protocol, the backup path is changed to the new primary (RPF) path (steps 70 and 72). If the failure is not confirmed after a predetermined period of time (e.g., 5-10 seconds), the receiver 12 may switch back to the primary path (step 74) or remain on the backup path and switch the primary and backup paths (i.e., switch the primary path to the backup path and the backup path to the primary path) (step 76). It is to be understood that the "predetermined period of time" may be a set value or a calculated value that may vary.

The following provides additional implementation examples of the multicast fast reroute process described above.

FIG. 3 illustrates an example of multicast fast reroute in a network with cascaded parallel paths. The network includes a source 30 (node A), receiver 32 (node J), and a plurality of intermediate nodes 34 (B, C, D, E, F, G, H, I). Loop-free paths are created at the source node 30 and node C. In this example, the paths extending between node B and node H are not configured as loop-free paths, and therefore not configured for multicast fast reroute (independent from the overall reroute between the source 30 and receiver 32). A join message is sent from receiver 32 to source 30 through intermediate nodes I, G, and C. The primary data path is from source 30 to receiver 32 through intermediate nodes C, G, and I. Since this group of nodes (C, F, G, I) are configured with loop-free paths, an alternate join message is sent from node I to node F (on non-RPF path). An alternate join message is also sent from node F to node C (on RPF path). A backup path is created from node C to node I, through node F. Packets sent on this path will be dropped (RPF fail) at node I (receiver) until needed. An alternate join message is sent from receiver 32 to node H (on non-RPF path) and from node H to source node 30, through intermediate nodes D and B (on RPF path). Data from the backup path is dropped at receiver 32 until needed, as previously described.

FIG. 4 illustrates an example of multicast fast reroute in a network comprising a core network and a plurality of access and distribution networks. Only two access networks and two distribution networks are shown, however, any number and arrangement of networks may be used. A source is located within access network 43. A primary data path extends from the source though distribution network 44, core network 41, distribution network 46, and access network 48. As shown in FIG. 4, there are multiple links between access network 43 and distribution network 44, and between distribution network 44 and core network 41. The primary data path passes through node D, node F, and node H. A join message is sent from node H to the source through node F and node D. An alternate join message is sent from node H to source 40 through node E, node C, and node B. A backup data path extends from source 40 to node H through node B, node C, and node E. A backup data path also extends from node C to node F to provide a backup for the link between node D and F. Another backup data path extends from node D to node E to provide a backup for the link between node C and E. Packets from the backup data path are dropped (due to RPF fail at X) until a failure on the primary data path is identified. For example, if a failure occurs in the primary path between access network 43 and distribution network 46, node F will switch to the backup data path. If a failure occurs in the primary path between node F and node H, node H will switch to the backup path.

It is to be understood that the networks shown in FIGS. 1, 3, and 4 are provided only as examples and that the multicast fast reroute described herein can be implemented in networks having different network elements or arrangements without departing from the scope of the invention.

Figure 7:
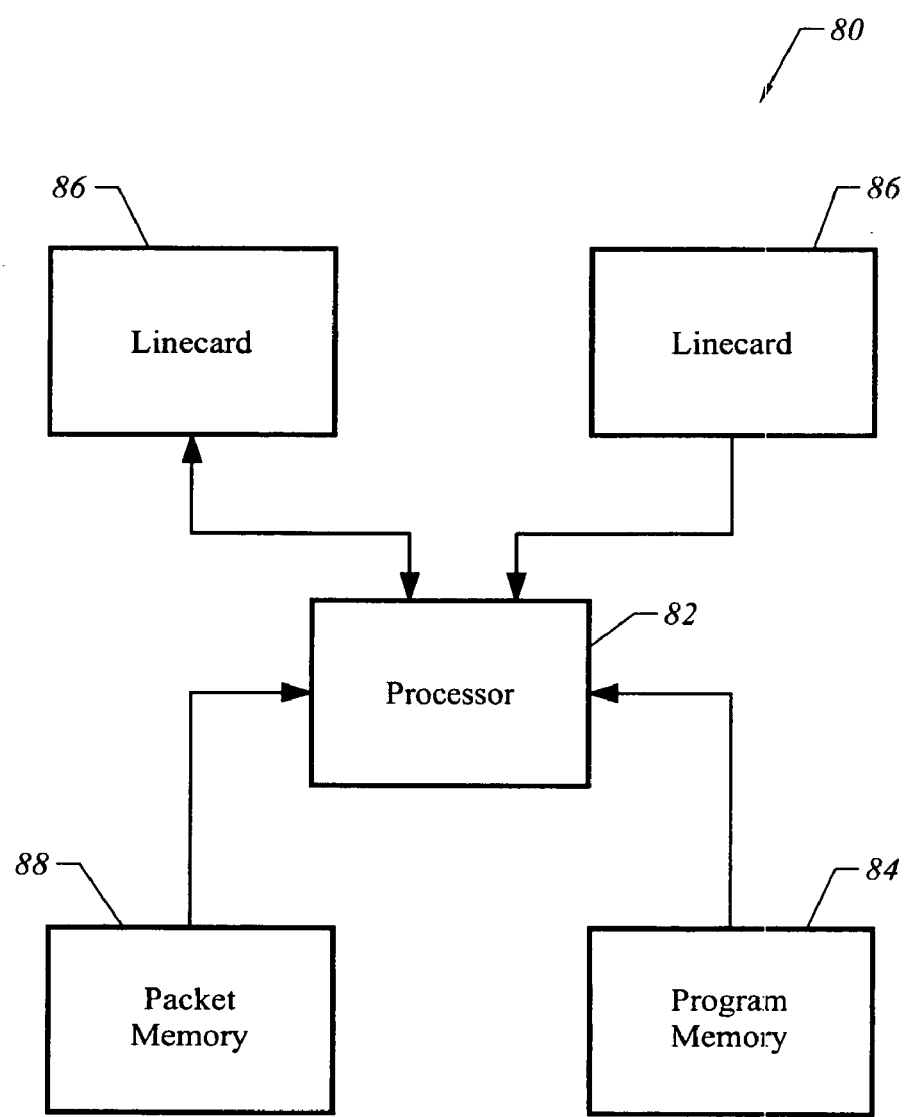
FIG. 7 depicts an example of a network device useful in implementing embodiments described herein.

FIG. 7 depicts a network device 80 that may be used to implement embodiments described herein. In one embodiment, network device 80 is a programmable machine that may be implemented in hardware. A processor 82 executes codes stored in a program memory 84. Program memory 84 is one example of a computer-readable medium. Program memory 84 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole.

As can be observed from the foregoing, the multicast fast reroute system and method described herein provide numerous advantages. For example, multicast routing protocols can reroute multicast data without having to wait for unicast routing protocols to identify a network failure. Also, a redundant data stream is produced in the network without creating separate multicast hosts, as required in a source redundancy model. There is, therefore, no need to provision multiple sources or synchronize data streams. The system is configured to provide points that the data can be easily discarded until needed, to reduce any negative effects of wasted bandwidth and switching resources.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for fast reroute of multicast data at a receiver following a network failure, comprising:
   transmitting a multicast join message from the receiver towards a source on a primary path;
   transmitting an alternate multicast join message from the receiver towards the source on a backup path;
   receiving at the receiver, data packets from said primary path and said backup path;
   operating in a first mode wherein the data packets received from said primary path are accepted and processed at the receiver, and the data packets received from said backup path are dropped due to an RPF (Reverse Path Forwarding) failure; and
   switching to a second mode wherein the data packets received from said backup path are accepted and processed at the receiver, upon detecting a failure in said primary path.

2. The method of claim 1 wherein detecting a failure in said primary path comprises receiving notification of a failure in a link connected to the receiver or a node in communication with the receiver through the link.

3. The method of claim 1 further comprising monitoring data flow from said primary path.

4. The method of claim 3 wherein detecting a failure in said primary path comprises detecting a failure if a new packet is not received from said primary path within a specified time interval.

5. The method of claim 1 further comprising receiving notification of the failure from a unicast routing protocol and continuing to operate in said second mode.

6. The method of claim 1 further comprising switching back to said first mode if a failure notification is not received from a unicast routing protocol in a predetermined period of time.

7. A method for identifying a network failure and rerouting multicast data at a network device, comprising:
   receiving multicast data from a primary path and a backup path at a network device;
   operating the network device in a first mode wherein the multicast data received from said backup path is dropped due to an RPF (Reverse Path Forwarding) failure;
   monitoring at the network device, the multicast data received from said primary path and identifying a failure in said primary path if flow of said monitored multicast data stops for more than a specified time interval; and
   switching to a second mode at the network device, wherein the multicast data received from said backup path is accepted, upon identification of a failure.

8. The method of claim 7 wherein monitoring said multicast data comprises incrementing a counter upon receiving a new packet from said primary path.

9. The method of claim 7 further comprising starting a timer upon receiving a new packet from said primary path.

10. The method of claim 7 wherein said specified time interval is approximately 100 ms.

11. The method of claim 7 wherein switching to said second mode comprises switching to said second mode in less than 10 milliseconds after identification of the failure.

12. The method of claim 7 further comprising receiving notification of the failure from a unicast routing protocol and continuing to operate in said second mode.

13. The method of claim 7 further comprising switching back to said first mode if a failure notification is not received from a unicast routing protocol in a predetermined period of time.

14. An apparatus for fast reroute of multicast data at a receiver following a network failure, comprising:
   a transmitter configured to transmit a multicast join message from the receiver towards a source on a primary path and transmit an alternate multicast join message from the receiver towards the source on a backup path;
   a processor operable to process data packets; and
   a controller configured to operate in a first mode wherein data packets received from said primary path are forwarded to the processor and data packets received from said backup path are dropped, and switch to a second mode wherein the data packets received from said backup path are forwarded to the processor, upon notification of a failure in said primary path;
   wherein the controller is configured to identify said backup path as a Reverse Path Forwarding (RPF) path upon receiving a failure notification from a unicast routing protocol.

15. The apparatus of claim 14 wherein the controller is configured to identify a Reverse Path Forwarding (RPF) failure for the data packets received from said backup path in said first mode.

16. The apparatus of claim 14 wherein the processor is configured to detect said failure in said primary path if a new packet is not received from said primary path within a specified time interval.

17. An apparatus for identifying a network failure and rerouting multicast data following a network failure, comprising:
   a receiver operable to receive multicast data from a primary path and a backup path;
   a monitor configured to monitor multicast data received from said primary path and identify a failure in said primary path if flow of said monitored multicast data stops for more than a specified time interval; and
   a controller configured to switch from a first mode wherein the controller forwards multicast data from said primary path to a processor and drops the multicast data from said backup path, to a second mode wherein the controller forwards the multicast data from said backup path to the processor, upon identification of a failure in said primary path;
   wherein the controller is configured to identify said backup path as a Reverse Path Forwarding (RPF) path upon receiving a failure notification from a unicast routing protocol.

18. The apparatus of claim 17 wherein the monitor further comprises a counter for counting the data packets received from said primary path.

19. The apparatus of claim 17 wherein said specified time interval comprises an interpacket delay.

20. The apparatus of claim 17 wherein the controller is configured to identify a Reverse Path Forwarding (RPF) failure for the data packets received from said backup path in said first mode.

* * * * *